United States Patent
Lin et al.

(10) Patent No.: US 8,345,583 B2
(45) Date of Patent: Jan. 1, 2013

(54) METHOD FOR ENHANCING ETHERNET CHANNEL IMPAIRMENT AND APPARATUS USING THE SAME

(75) Inventors: Guan Henry Lin, Hsinchu County (TW); Wen Sheng Hou, Hsinchu County (TW); Kai Taing Yang, Hsinchu County (TW)

(73) Assignee: Ralink Technology Corporation, Hsinchu (TW)

( * ) Notice: Subject to any disclaimer, the term of this patent is extended or adjusted under 35 U.S.C. 154(b) by 263 days.

(21) Appl. No.: 12/704,478

(22) Filed: Feb. 11, 2010

(65) Prior Publication Data

US 2010/0290333 A1 Nov. 18, 2010

(30) Foreign Application Priority Data

May 12, 2009 (TW) .............................. 98115629 A

(51) Int. Cl.
*H04B 3/20* (2006.01)
(52) U.S. Cl. ....................................................... 370/286
(58) Field of Classification Search .................. 370/286, 370/290, 289; 379/406.08, 406.01, 406.09, 379/406.06, 406.03

See application file for complete search history.

(56) References Cited

U.S. PATENT DOCUMENTS

| 4,291,332 | A | 9/1981 | Kato et al. |
| 6,463,041 | B1 | 10/2002 | Agazzi |
| 7,236,463 | B2 * | 6/2007 | Lai ................................ 370/286 |
| 7,590,077 | B2 * | 9/2009 | Shida ............................ 370/286 |
| 7,738,655 | B2 * | 6/2010 | Sharon et al. ............. 379/406.08 |

OTHER PUBLICATIONS

Office Action issued Aug. 24, 2012 to the corresponding TW patent application No. 098115629 cites: US6463041B1, US4291332 and US7236463B2.
English translation of Office Action issued Aug. 24, 2012 to the corresponding TW patent application No. 098115629.

* cited by examiner

*Primary Examiner* — Chandrahas Patel
(74) *Attorney, Agent, or Firm* — WPAT, P.C.; Anthony King

(57) ABSTRACT

A method for enhancing Ethernet channel impairment comprises the steps of sending a sequence to a receiver in a slave transceiver by a master transceiver, and training cancellation filter coefficients of an echo canceller and a near-end cross talk canceller in the master transceiver before the receiver of the slave transceiver converges.

14 Claims, 3 Drawing Sheets

METHOD FOR ENHANCING ETHERNET CHANNEL IMPAIRMENT AND APPARATUS USING THE SAME

BACKGROUND OF THE INVENTION

1. Field of the Invention

The present invention relates to a method for high-speed Ethernet channel impairment enhancement and apparatus using the same.

2. Description of the Related Art

Among high data rate transmission systems, high-speed Ethernet local area networks (LANs), 100 BASE-TX Ethernet and 1000 Base TX Ethernet using category-5 or above 5 copper wire are all being developed rapidly. The 1000 Base TX Ethernet, also called gigabit Ethernet, uses four unshielded twisted pairs of wires to transmit data at 1 Gb/second. In the case of using Ethernet to communicate in a communication network, an extremely low bit error rate (BER) is required to transmit encoded data. However, in a communication system with a number of unshielded twisted pairs of wires and transceivers, issues of channel impairment, such as fading, near-end cross talk, echo, and noise, are encountered frequently, which causes unclean signals and affects coding.

FIG. 1 shows a block diagram of a typical communication system 10. The communication system 10 comprises a plurality of transceivers 12, a plurality of hybrids 14, and a plurality of communication lines 16 including four unshielded twisted pairs of wires 18. Referring to FIG. 1, the transceivers 12 comprise a transmitter TX and a receiver RX. The hybrids are positioned between each transceiver 12 and its associated unshielded twisted pair 18. The hybrids 14 control access to the communication lines 16, thereby allowing for full-duplex bidirectional operation between the transceivers 12 at each end of the communication lines 16. The hybrids 14 are also used to isolate the transmitter and receiver associated with the transceiver.

A signal NEXT in FIG. 1 is a channel impairment signal, which results from capacitive coupling of the signals from the near-end transmitters TX to the input of the receivers RX. The NEXT impairment signals received by the receiver RX in a transceiver A are shown in FIG. 1, and the crosstalk signals are generated by transceivers B, C, and D. Similarly, because of the bidirectional nature of the communication systems, an echo impairment signal ECHO is produced by each transmitter on the receiver contained within the same transceiver as shown in FIG. 1. To reduce the BER when communicating over the communication systems, the transceiver requires adding an echo canceller and a near-end cross talk canceller to suppress the impairment signals.

Assume that a device with the transceivers shown in FIG. 1 is a master device that is coupled to a slave device. First, the master device sends an idle sequence to the slave device, and trains its echo canceller and near-end cross talk canceller before the slave device sends a signal. The cancellation filter coefficients of the echo canceller and near-end cross talk canceller are used to obtain impulse responses of the echo signal and the near-end cross talk signal at this stage so as to eliminate the impairment signals. However, since the timing between the transmitter TX and the receivers RX are not exactly the same, the output signals of the echo canceller and the near-end cross talk canceller have phase differences between the ideal echo and near-end cross talk canceller, therefore, such method cannot suppress the echo and the near-end cross talk problem efficiently. Accordingly, it is desirable to provide a method for enhancing Ethernet channel impairment and apparatus using the same for eliminating noise problems including echo and near-end cross talk so as to reduce the BER and improve the transmission quality of high-speed Ethernet communications.

SUMMARY OF THE INVENTION

According to one embodiment of the present invention, an Ethernet channel impairment enhancement apparatus comprises a transmitter, a receiver, an adder, an echo canceller, a near-end cross talk canceller, an analog to digital converter, and a clock generating unit. The transmitter has a first channel and other channels, and the adder is configured to couple the receiver. The echo canceller is configured to couple between the first channel of the transmitter and the adder and has an echo cancellation filter coefficient. The near-end cross talk canceller is configured to couple between the other channels of the transmitter and the adder and has a near-end cross talk cancellation filter coefficient. The analog to digital converter is configured to output a signal to the adder according to a clock signal, and the clock generating unit is configured to selectively output a timing recovery signal or a phase increment signal as the clock signal. The clock signal has a predetermined phase.

According to another embodiment of the present invention, an Ethernet channel impairment enhancement apparatus which trains an echo cancellation filter coefficient of an echo canceller and a near-end cross talk cancellation filter coefficient of a near-end cross talk canceller in a transceiver in advance, wherein the transceiver comprises a receiver and an analog to digital converter operated according to a clock signal, and the clock signal has a predetermined phase. The Ethernet channel impairment enhancement apparatus comprises a clock phase controller, a timing recovery circuit, a multiplexor, a memory and a write/read unit. The clock phase controller is configured to generate a phase increment signal according to a continuous incremental phase sequence, and the timing recovery circuit is configured to generate a timing recovery signal. The multiplexor is configured to selectively switch between the timing recovery signal and the phase increment signal so as to adjust the predetermined phase of the clock signal. The memory is configured to receive signals outputted from the multiplexor, and the write/read unit is configured to control the write and read operation of the memory.

According to one embodiment of the present invention, a method for enhancing Ethernet channel impairment comprises the steps of sending a sequence to a receiver in a slave transceiver by a master transceiver, and training cancellation filter coefficients of an echo canceller and a near-end cross talk canceller in the master transceiver before the receiver of the slave transceiver converges.

BRIEF DESCRIPTION OF THE DRAWINGS

The invention will be described according to the appended drawings in which.

DETAILED DESCRIPTION OF THE INVENTION

Figure 1:
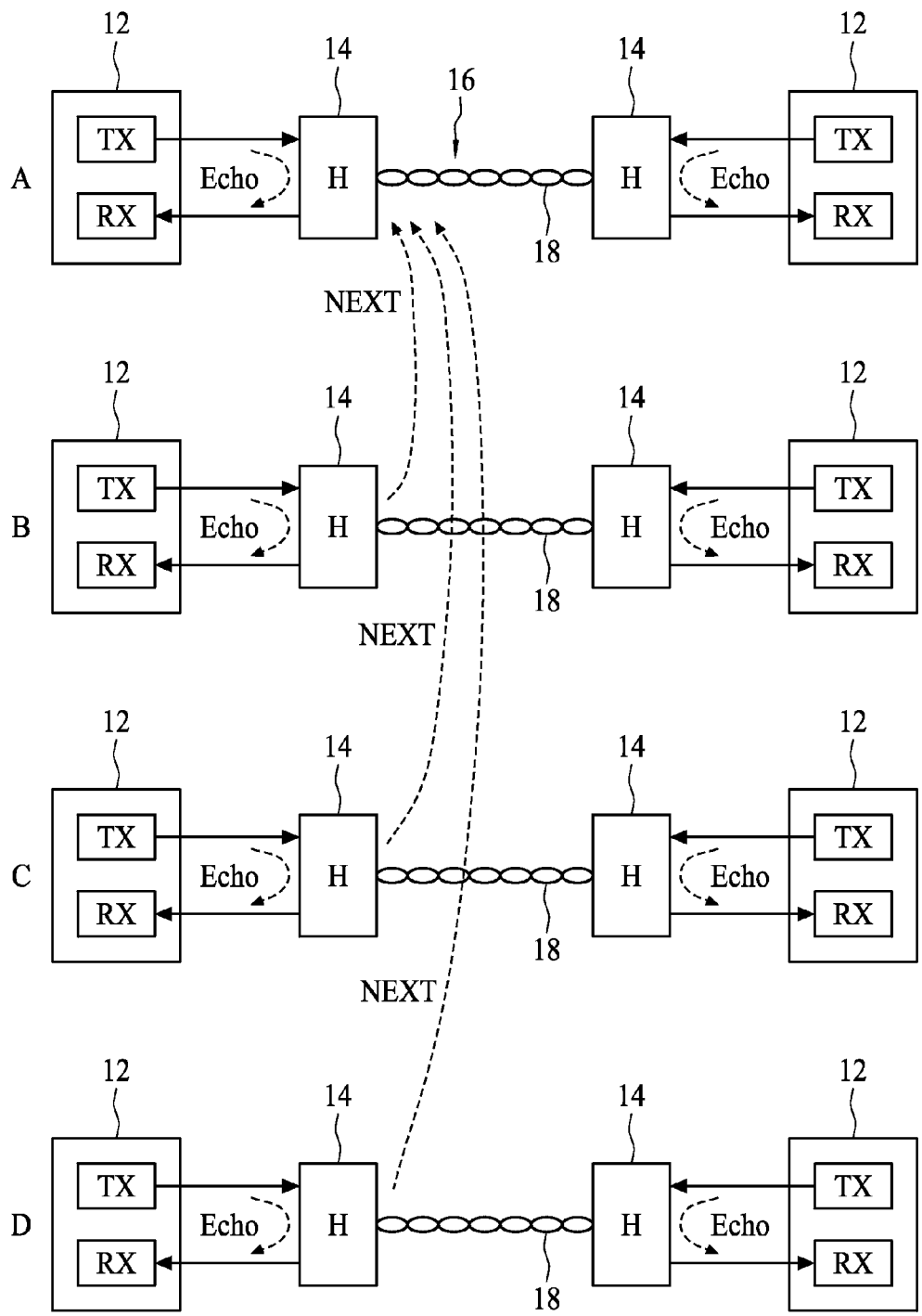
FIG. 1 shows a block diagram of a typical communication system.
Figure 2:
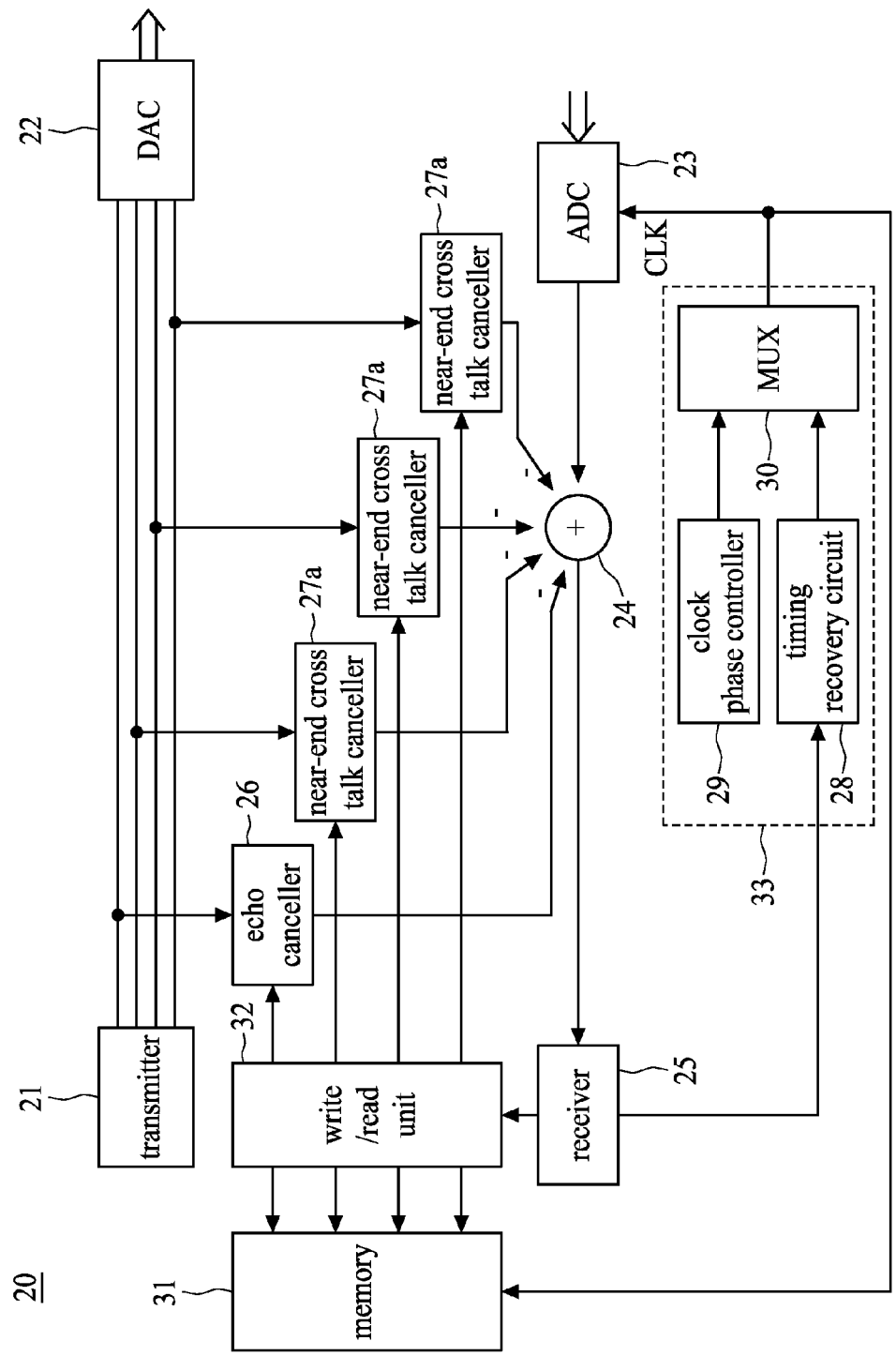
FIG. 2 illustrates the block diagram of a high-speed Ethernet channel impairment enhancement apparatus in accordance with an exemplary embodiment.

FIG. 2 illustrates the block diagram of a high-speed Ethernet channel impairment enhancement apparatus 20 in accordance with an exemplary embodiment. Referring to FIG. 2, a transmitter 21 sends signals to channels through a digital to analog converter (DAC) 22. Signals from the channels are digitalized through an analog to digital converter (ADC) 23 and then sent to an adder 24 and a receiver 25. An echo canceller 26 is positioned between the transmitter 21 and the adder 24 and configured to predict an echo pulse response in the same channel within the same transceiver. The output signal of the echo canceller 26 is subtracted by the adder 24. Near-end cross talk cancellers 27a, 27b, and 27c are positioned between the transmitter 21 and the adder 24 and configured to predict pulse responses among other channels within the same transceiver. The output signals of the near-end cross talk cancellers 27a, 27b, and 27c are then subtracted by the adder 24.

The ADC 23 are sampled according to a period and phase of a clock signal CLK controlled by a multiplexor (MUX) 30. Although the period of the clock signal CLK at a signal receiving end can be controlled in advance to be approximately the same as the signal at a signal transmitting end, the phase of the clock signal CLK cannot be controlled in advance to be synchronous with the signal transmitting end. Therefore, a phase recovery of the clock signal CLK should be used to obtain the best time domain sample point so as to reduce the BER of the receiving digital signals. The phase recovery of the clock signal CLK is achieved by a timing recovery circuit 28, and the achievement can be referred to as "Timing Recovery in Digital Synchronous Receivers" by K H Mueller and M. Muller. The Mueller and Muller algorithm is described in the IEEE Transactions on Communications, May, 1976, pages 516-531 and is used obtain a function is whose value is variable in response to the variety of the phase of the clock signal CLK. When the value is zero, the phase to which the clock signal CLK responds is optimized. When the ADC 23 is sampled according to the optimize phase, the BER of the receiving digital signals can be minimized.

The optimize phase of the clock signal CLK obtained by the above-mentioned method has a phase difference from the predetermined phase of the clock signal CLK. In a prior method, if the ADC 23 is sampled according to the predetermined phase of the clock signal CLK, the cancellation filter coefficients trained by the echo canceller 26 and the near-end cross talk cancellers 27a, 27b, and 27c cannot make the system converge when the phase is varied. Therefore, in an exemplary embodiment, the phase of the ADC 23 is provided by a clock generating unit 33. The clock generating unit 33 comprises a clock phase controller 29, the timing recovery circuit 28, and the MUX 30. The clock phase controller 29 is configured to generate a specific phase increment so as to control the sampling timing of the ADC 23 before the slave transceiver sends data. When the slave transceiver starts to send the data, the MUX 30 selectively switches the output signal of the clock phase controller 29 to the output signal of the timing recovery circuit 28 so as to generate the optimize phase of the clock signal CLK.

Figure 3:
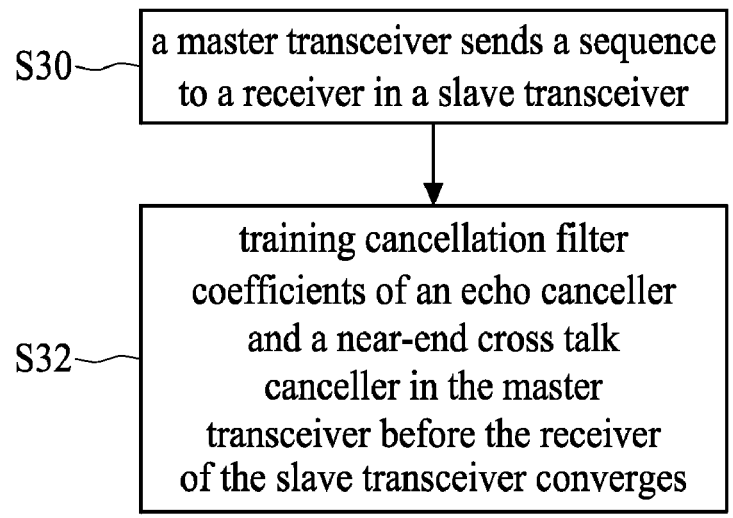
FIG. 3 shows the flow chart of the method for enhancing Ethernet channel impairment enhancement in accordance with an exemplary embodiment.

In order to explain the operation method of the high-speed Ethernet channel impairment enhancement apparatus of the present invention more clearly, FIG. 3 shows the flow chart of the method for enhancing Ethernet channel impairment enhancement in accordance with an exemplary embodiment. In step S30, a master transceiver sends a sequence, such as a training sequence, to a receiver in a slave transceiver. In step S32, cancellation filter coefficients of an echo canceller and near-end cross talk cancellers in the master transceiver are trained before the receiver of the slave transceiver converges.

Figure 4:
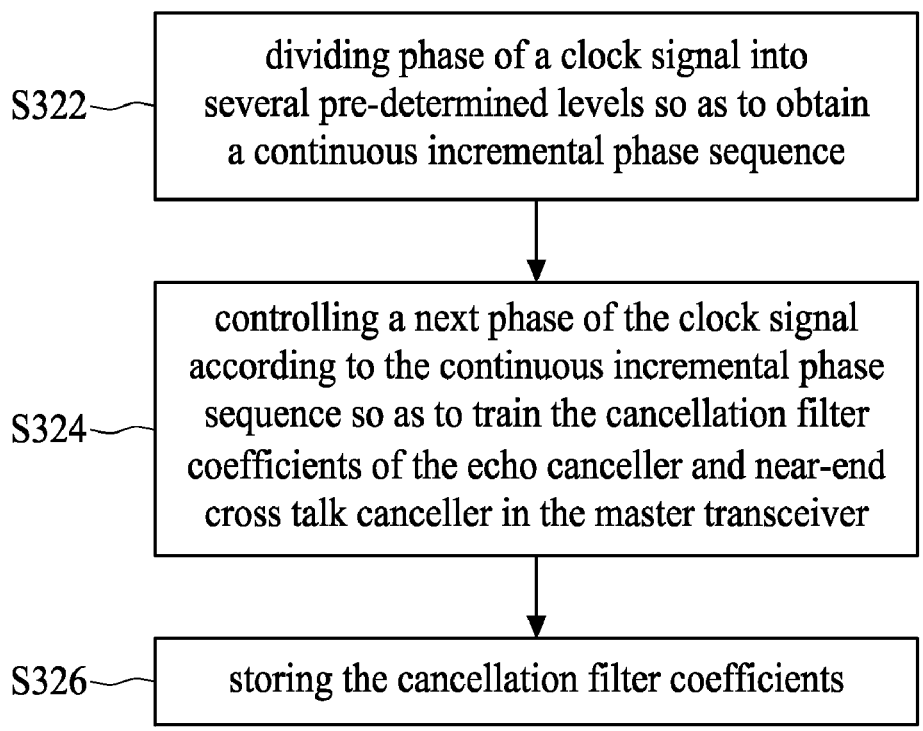
FIG. 4 shows a detailed description of step S32 in FIG. 3.

FIG. 4 shows the details described in step S32. In step S322, phase of a clock signal is divided into several predetermined levels so as to obtain a continuous incremental phase sequence. In step S324, a next phase of the clock signal is controlled according to the continuous incremental phase sequence so as to train the cancellation filter coefficients of the echo canceller and near-end cross talk cancellers in the master transceiver. In step S326, the cancellation filter coefficients are stored.

In FIGS. 2, 3, and 4, the high-speed Ethernet channel impairment enhancement apparatus 20 is a master transceiver which sends a sequence to a receiver in a slave transceiver (not shown). The master transceiver trains the cancellation filter coefficients of its echo canceller 26 and near-end cross talk cancellers 27a, 27b, and 27c before the receiver of the slave transceiver converges. The training steps comprise generating a continuous incremental phase sequence by the clock phase controller 29. The continuous incremental phase sequence is obtained by using an integer to divide a predetermined phase of a clock signal CLK. For example, if the predetermined phase of the clock signal CLK can be divided into 64 parts, then the continuous incremental phase sequence is [0, 1, 2, 3, . . . , 62, 63] when the integer is set to 1. Alternatively, when the integer is set to 4, the continuous incremental phase sequence is [0, 4, 8, . . . , 56, 60], wherein the element of the sequence refers to an Nth phase of the predetermined 64 phases of the clock signal CLK.

In an exemplary embodiment, if the integer is set to 4, the master transceiver starts from the 0th phase of the predetermined 64 phases of the clock signal CLK to train the cancellation filter coefficients of its echo canceller 26 and near-end cross talk cancellers 27a, 27b, and 27c. Next, the master transceiver trains the cancellation filter coefficients of its echo canceller 26 and near-end cross talk cancellers 27a, 27b, and 27c according to the 4th phase of the predetermined 64 phases of the clock signal CLK. In such way, the master transceiver trains the cancellation filter coefficients of its echo canceller 26 and near-end cross talk cancellers 27a, 27b, and 27c according to the 60th phase of the predetermined 64 phases of the clock signal CLK. After the training, the cancellation filter coefficients write to a memory 31 in FIG. 2 through a write/read unit 32 for the next step.

After the slave transceiver converges, the slave transceiver sends data to the master transceiver. When the data enter the receiver 25 of the master transceiver, the master transceiver proceeds to recovery the phase of the clock signal CLK by the timing recovery circuit 28. At this time, the MUX 30 selectively switches the output signal of the clock phase controller 29 to the output signal of the timing recovery circuit 28 so as to control the phase of the clock signal CLK. The phase of the clock signal CLK is adjusted from the predetermined phase to an optimized sampling phase in a fixed period of time with the above-mentioned Mueller and Muller method or other phase adjusting method.

Within a fixed period of time, the receiver 25 reads the cancellation filter coefficients of the echo canceller 26 and near-end cross talk cancellers 27a, 27b, and 27C stored in the memory 31 closest to the optimized cancellation filter coefficients by the write/read unit 32, and uses the phase as an initial phase to proceed a convergence operation in a system. Alternatively, the memory 31 can use an interpolation method to obtain the related coefficients of other phases not contained within the continuous incremental phase sequence according to the stored cancellation filter coefficients. In the above method, the system does not start the operation from the 0th phase of the predetermined 64 phases of the clock signal CLK, and the memory has already stored the plurality of cancellation filter coefficients of the echo canceller 26 and near-end cross talk cancellers 27a, 27b, and 27c in advance, thereby reducing the convergence time of the system significantly and simplifying the operational process.

The above-described embodiments of the present invention are intended to be illustrative only. Numerous alternative embodiments may be devised by those skilled in the art without departing from the scope of the following claims.

What is claimed is:

1. An Ethernet channel impairment enhancement apparatus, comprising:
   a transmitter with a first channel and other channels;
   a receiver;
   an adder configured to couple the receiver;
   an echo canceller configured to couple between the first channel of the transmitter and the adder and having an echo cancellation filter coefficient;
   a near-end cross talk canceller configured to couple between the other channels of the transmitter and the adder and having a near-end cross talk cancellation filter coefficient;
   an analog to digital converter configured to output a signal to the adder according to a clock signal; and
   a clock generating unit configured to selectively output a timing recovery signal or a phase increment signal as the clock signal;
   wherein the clock generating unit further comprising:
   a clock phase controller configured to generate the phase increment signal according to a continuous incremental phase sequence;
   a timing recovery circuit configured to generate the timing recovery signal; and
   a multiplexor configured to selectively switch between the timing recovery signal and the phase increment signal so as to adjust the predetermined phase of the clock signal, wherein the multiplexor outputs the phase increment signal before the receiver receives data from another transmitter, and outputs the timing recovery signal after the receiver receives the data from the another transmitter; and
   wherein the clock signal has a predetermined phase.

2. The Ethernet channel impairment enhancement apparatus of claim 1, further comprising a memory and a write/read unit, wherein the write/read unit writes the echo cancellation filter coefficient of the echo canceller and the near-end cross talk cancellation filter coefficient of the near-end cross talk canceller into the memory according to the phase increment signal of the clock phase controller.

3. The Ethernet channel impairment enhancement apparatus of claim 2, wherein the write/read unit reads a phase of the echo cancellation filter coefficient of the echo canceller and the near-end cross talk cancellation filter coefficient of the near-end cross talk canceller in the memory closest to the adjusted phase of the clock signal according to the timing recovery signal of the timing recovery circuit.

4. The Ethernet channel impairment enhancement apparatus of claim 1, wherein the continuous incremental phase sequence is obtained by using an integer to divide the predetermined phase of the clock signal.

5. The Ethernet channel impairment enhancement apparatus of claim 1, further comprising an interpolation operational apparatus to calculate a phase of the echo cancellation filter coefficient of the echo canceller and the near-end cross talk cancellation filter coefficient of the near-end cross talk canceller which are not contained within the continuous incremental phase sequence.

6. A method for enhancing Ethernet channel impairment, comprising:

sending a sequence from a master transceiver to a receiver of a slave transceiver; and
training cancellation filter coefficients of an echo canceller and a near-end cross talk canceller in the master transceiver before the receiver of the slave transceiver converges;
wherein the training step further comprises:
dividing phase of a clock signal into several pre-determined levels by using an integer so as to obtain a continuous incremental phase sequence;
controlling a next phase of the clock signal according to the continuous incremental phase sequence so as to train the cancellation filter coefficients of the echo canceller and near-end cross talk canceller in the master transceiver; and
storing the cancellation filter coefficients.

7. The method of claim 6, wherein the integer is 1 or greater than 1.

8. The method of claim 6, further comprising an interpolation operational apparatus to calculate the phase of the cancellation filter coefficient of the echo canceller and the near-end cross talk canceller which are not contained within the continuous incremental phase sequence.

9. The method of claim 6, further comprising:
   adjusting the predetermined phase of the clock signal to an optimized sampling phase in a fixed period of time when data enter a receiver of the master transceiver;
   selecting a phase closest to the optimized sampling phase within the continuous incremental phase sequence as an initial phase in the fixed period of time; and
   proceeding a convergence operation according to the stored cancellation filter coefficients of the echo canceller and near-end cross talk cancellers of the initial phase.

10. An Ethernet channel impairment enhancement apparatus which trains an echo cancellation filter coefficient of an echo canceller and a near-end cross talk cancellation filter coefficient of a near-end cross talk canceller in a transceiver in advance, the transceiver comprising a receiver and an analog to digital converter operated according to a clock signal, the clock signal having a predetermined phase, and the Ethernet channel impairment enhancement apparatus comprising:
   a clock phase controller configured to generate a phase increment signal according to a continuous incremental phase sequence;
   a timing recovery circuit configured to generate a timing recovery signal;
   a multiplexor configured to selectively switch between the timing recovery signal and the phase increment signal so as to adjust the predetermined phase of the clock signal;
   a memory configured to receive signals outputted from the multiplexor; and
   a write/read unit configured to control write and read operations of the memory;
   wherein the multiplexor outputs the phase increment signal before the receiver receives data from another transmitter, and the multiplexor outputs the timing recovery signal after the receiver receives the data from the another transmitter.

11. The Ethernet channel impairment enhancement apparatus of claim 10, wherein the write/read unit writes the echo cancellation filter coefficient of the echo canceller and the near-end cross talk cancellation filter coefficient of the near-end cross talk canceller into the memory according to the phase increment signal of the clock phase controller.

12. The Ethernet channel impairment enhancement apparatus of claim 11, wherein the write/read unit reads a phase of the echo cancellation filter coefficient of the echo canceller and the near-end cross talk cancellation filter coefficient of the near-end cross talk canceller in the memory closest to the adjusted phase of the clock signal according to the timing recovery signal of the timing recovery circuit.

13. The Ethernet channel impairment enhancement apparatus of claim 10, further comprising an interpolation operational apparatus to calculate the phase of the echo cancellation filter coefficient of the echo canceller and the near-end cross talk cancellation filter coefficient of the near-end cross talk canceller which are not contained within the continuous incremental phase sequence.

14. The Ethernet channel impairment enhancement apparatus of claim 10, wherein the continuous incremental phase sequence is obtained by using an integer to divide the predetermined phase of the clock signal.

* * * * *